July 11, 1944.  R. H. VALENTINE  2,353,529
BEARING MOUNTING
Filed Feb. 12, 1943

INVENTOR:
RICHARD H. VALENTINE,
BY Romeyn A. Spare
HIS ATTORNEY.

Patented July 11, 1944

2,353,529

UNITED STATES PATENT OFFICE 2,353,529

BEARING MOUNTING

Richard H. Valentine, Grosse Pointe Farms, Mich., assignor to General Motors Corporation, Detroit, Mich., a corporation of Delaware Application February 12, 1943, Serial No. 475,627

7 Claims. (Cl. 308—187.1)

This invention relates to bearing mountings and comprises all of the features and aspects of novelty herein disclosed. An object of the invention is to provide a device which will avoid injury to antifriction bearings, especially ball bearings when other parts are being assembled with them on their supports. Another object is to provide a barrier which will exclude foreign matter from a bearing and its housing while permitting a shaft inside the housing to be backed up against the thrust of a pressing operation, as when a pulley, gear, fly wheel or the like is pressed on the shaft. Another object is to provide an elastic barrier which will normally lie clear of a shaft but be movable against the shaft by a suitable tool which acts as an anvil or abutment for the shaft.

Figure 1:
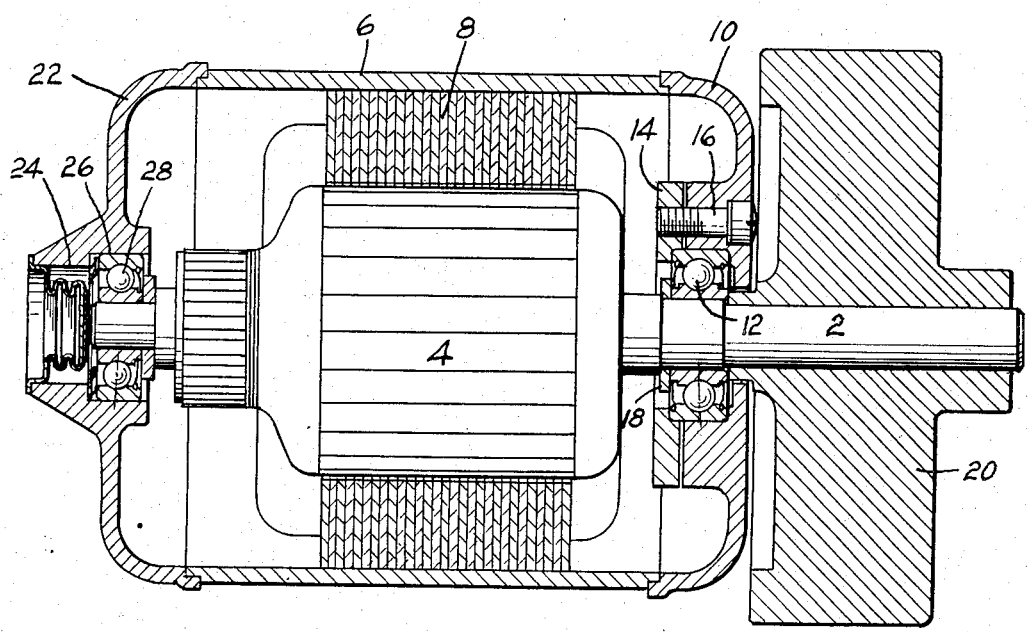
Figure 2:
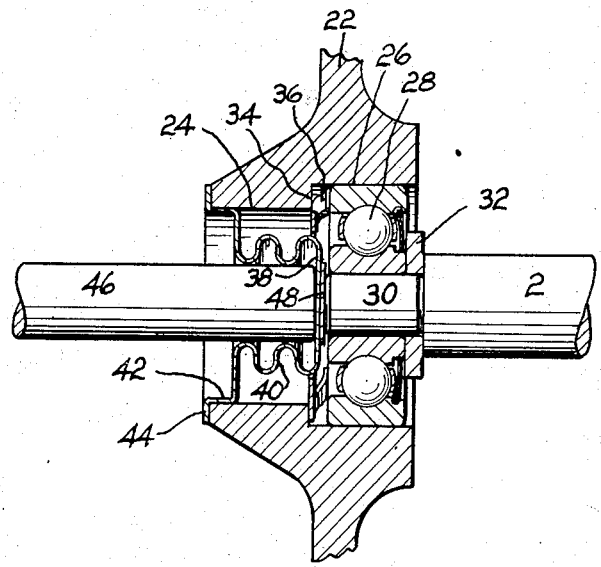

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a longitudinal sectional view of one illustrative embodiment of the invention;

Fig. 2 is an enlarged view of a portion of Fig. 1.

A shaft 2 carrying a rotor 4 is journalled in the ends of a housing 6 which supports the core 8 of a stator winding. Closing one end of the housing is a detachable end wall or plate 10 having a shouldered recess for locating the outer race ring of an antifriction bearing 12, the race ring being clamped in the recess by a clamping ring 14 fastened to the end plate 16 by screws 16. The inner race ring of the bearing is clamped against a washer 18 or other shoulder on the shaft by a pressed-on member 20 herein shown as a flywheel 26 of a gyromotor.

At the other end of the housing is a detachable end plate 22 having an opening 24 provided with a counterbore 26 in which is slidably mounted the outer race ring of an antifriction bearing 28, the inner race ring of the bearing being fitted on a reduced extension 30 of the shaft to abut against a washer 32 or other shoulder of the shaft. Engaging a shoulder 34 formed at the end of the counterbore 26 is a washer having spring fingers 36 which abut against the outer race ring and urge it axially to apply a pre-load to the two bearings. Slidability of the bearing 28 allows for expansion of the shaft due to heat. The bearings are illustrative of any suitable bearings for the purpose and are herein shown as ball bearings which become preloaded along angular contact lines as indicated in Fig. 1. The right hand bearing is fixed against axial movement and is sealed up at both sides by the usual shields whereas the left hand bearing is slidable in its seat and is shown as having a shield on one side.

If in the foregoing structure, the antifriction bearings are subject to a heavy thrust load beyond that prevailing in use (as when, during assembly, a member such as the fly wheel 20 is pressed on the end of the shaft) the bearings would be subject to injury by the balls brinelling or indenting the raceways. The least indenting is not permissible for a precision device such as indicated nor is the admission of the least bit of dust or other foreign matter to the bearings. Accordingly, to relieve the bearings from any injurious thrust load during such pressure assembly and to keep out dust, I provide an extensible elastic barrier into which a suitable tool or anvil can be temporarily inserted to back up the shaft. The barrier is shown as a metalic bellows having a bottom wall 38 and an extensible side wall 40. The side wall is enlarged at 42 to fit the bore 24 and terminates in a flange 44 which fits the face of the end plate 22. The angular terminal of the barrier is preferably brazed to the end plate so that the barrier becomes a permanent, tight closure which is generally cup-shaped. When the shaft and its bearings are finally assembled in running position within the housing, the bottom wall 38 of the barrier will lie clear of the end of the shaft as indicated in Fig. 1 but, during assembly, the bottom wall can be temporarily moved up to the shaft by a ram 46 or abutment member inserted within the barrier to back up the shaft. The flywheel and/or other element can then be pressed on the shaft from the other end without transmitting any thrust load to the bearings. To protect the bottom wall 38 from the being pierced by the shaft extension, it may be advisable to braze a reinforcing disc 48 on the side opposite to the ram.

I claim:

1. In a device for preventing injury to an antifriction bearing, a housing having an opening therein, a shaft extending into the opening, an antifriction bearing seated in the opening and supporting the shaft and the housing for relative rotation, an elastic barrier closing the opening, and the barrier having a movable portion normally clearing the end of the shaft but close to it for engagement by an abutment member adapted to force the movable portion temporarily against the shaft to back up the shaft against an endwise pressure.

2. In a device for preventing injury to an antifriction bearing, a housing having an opening therein, a shaft extending into the opening, an antifriction bearing seated in the opening and supporting the shaft and the housing for relative rotation, an elastic barrier closing the opening and having a wall normally clearing the shaft, and the barrier being cupped to admit an abutment member for backing up the shaft against an endwise pressure.

3. In a device for preventing injury to an antifriction bearing, a housing having an opening therein, a shaft extending into the opening, an antifriction bearing seated in the opening and supporting the shaft and the housing for relative rotation, a cup-shaped barrier closing the opening and having its bottom wall normally clear of the end of the shaft, and the barrier having an extensible side wall to provide for insertion of an abutment member which will force the bottom wall against the shaft.

4. In a device for preventing injury to an an antifriction bearing seated in the opening ing therein, a shaft extending into the opening, an antifriction bearing seated in the opening and supporting the shaft and the housing for relative rotation, and an extensible bellows closing the opening, the bellows being generally cup-shaped and having its bottom wall normally clear of the end of the shaft.

5. In a device for preventing injury to an antifriction bearing, a housing having an opening therein, a shaft extending into the opening, an antifriction bearing slidably mounted in the opening and supporting the shaft and the housing for relative rotation, a cup shaped barrier having its rim fitting the opening and its bottom wall close to the end of the shaft, and the bottom wall thereby being movable against the shaft by an abutment member adapted to enter the cup to back up the shaft and the bottom wall when a heavy endwise pressure is exerted thereon.

6. In a device for preventing injury to an antifriction bearing, a housing having an opening therein, a shaft extending into the opening, an antifriction bearing slidably mounted in the opening and supporting the shaft and the housing for relative rotation, a barrier fixed to the housing for closing the opening and having a wall normally close to the end of the shaft, and the wall being movable against the shaft by an abutment member to back up the barrier and the shaft when a heavy endwise pressure is exerted on the shaft in the direction of the barrier.

7. In a device of the character indicated, a housing having an end wall with an opening therein, a shaft in the housing and terminating within the opening, a bearing between the shaft and the end wall to support the shaft and the housing for relative rotation, an extensible barrier closing the opening and having a movable portion normally clearing the end of the shaft, an element adapted to be pressed axially upon the shaft, and the barrier being constructed to be engaged by an abutment member to temporarily bring the movable portion of the barrier against the end of the shaft to take the reaction of the pressing operation.

RICHARD H. VALENTINE.

CERTIFICATE OF CORRECTION.

Patent No. 2,353,529. July 11, 1944.

RICHARD H. VALENTINE.

It is hereby certified that error appears in the printed specification of the above numbered patent requiring correction as follows: Page 1, second column, line 42, strike out the word "the" first occurrence; page 2, first column, line 25, claim 4, for "an antifriction bearing seated in the opening" read --antifriction bearing, a housing having an open- --; and that the said Letters Patent should be read with this correction therein that the same may conform to the record of the case in the Patent Office.

Signed and sealed this 22nd day of August, A. D. 1944.

Leslie Frazer (Seal) Acting Commissioner of Patents.